United States Patent

[11] 3,575,461

| [72] | Inventors | Gerald M. Goldman<br>185 Bronx River Road, Westchester County, 10704;<br>Sherman Smith, Nassau County, N.Y. |
|---|---|---|
| [21] | Appl. No. | 757,584 |
| [22] | Filed | Sept. 5, 1968 |
| [45] | Patented | Apr. 20, 1971 |
| [73] | Assignee | Said Smith assignor to said Goldman |

[54] BABY CARRIAGE
2 Claims, 3 Drawing Figs.

[52] U.S. Cl. .................................................. 296/28, 280/47.38
[51] Int. Cl. ...................................................... B62b 9/10
[50] Field of Search............................................ 296/1 (B), 28 (B), 78 (.2); 280/87.02 (W), 47.38

[56] References Cited

UNITED STATES PATENTS

| 174,721 | 3/1876 | Crandall..................... | 296/1 |
| 1,631,546 | 6/1927 | Nistler....................... | 296/1 |
| 2,193,469 | 3/1940 | Ashton........................ | 296/78X |
| 2,971,796 | 2/1961 | Morvai et al................. | 296/28 |

FOREIGN PATENTS

| 154,539 | 12/1953 | Australia..................... | 296/78 |
| 450,725 | 8/1949 | Italy.......................... | 296/28 |

OTHER REFERENCES

"Furniture Age" July 1941, Page 81

*Primary Examiner*—Leo Friaglia
*Assistant Examiner*—Leslie J. Paperner
*Attorney*—Michael Ebert

ABSTRACT: This invention relates to a baby carriage which provides a stimulating environment that allows an infant to increase its intellectual development. Transparent materials are inserted in strategic parts of the baby carriage to allow the infant to look through. This new concept in baby carriages provides the infant with the opportunity of using its visual powers more effectively by making available more for the infant to see.

PATENTED APR 20 1971

3,575,461

INVENTORS
GERALD M. GOLDMAN
SHERMAN SMITH

BABY CARRIAGE

This invention as will be described herein is predicated upon the theory that intellectual development is enhanced by visual observation in the early months of life. The more visual stimulation an infant receives, the greater is his potential to develop intellectually. In the presently available baby carriages the infant does not have the ability to see much more than the sky when he is lying on his back. While lying on his stomach he sees nothing more than the interior of the carriage. Sight is the sense that matures first in an infant. The infant's inability to raise his head above the level of the carriage precludes any intellectual benefits he may obtain from any object outside his carriage in the early months of life. When the infant begins to raise his head above the level of the carriage he tires rapidly and at that point lowers himself thereby limiting his visual observations.

The present invention has succeeded in eliminating the previous inadequacies. This invention provides transparent materials in strategic parts of the baby carriage to allow the child to see the outside world when he is on his stomach or back (which are the most common positions).

Recent studies have pointed up the importance of providing a stimulating environment for children in the early months of life. They indicate that a child benefits intellectually in later life from a stimulating environment in earlier life. These studies have shown that infants learn more in early life than was previously supposed. Formerly, the importance of providing a stimulating environment at an early age was not stressed.

A child begins to see objects in the early weeks of life. By the second month he recognizes a human face and responds to it. At the age of 3 months he is capable of looking in all directions.

Since sight is the earliest sense that matures in infants, maximum stimulation through the visual sense should be afforded to the child. The presently available baby carriages are constructed as a means of transportation for the child to give him an airing and very little else. This invention affords the child the opportunity of increasing his intellectual capacity while out for this airing. The importance of this concept can turn the philosophy of a baby carriage around to where it is designed to intellectually stimulate the child while at the same time hive him an airing.

In the prior art, windows have been provided in the hood portions of the carriage. Patents showing this feature are those of: Kilmer, U.S. Pat. No. 1,401,085; Bibo, U.S. Pat. No. 1,576,501; Hedstrom, Jr., U.S. Pat. No. 2,107,940; and Morvai et al., U.S. Pat. No. 2,971,796. These have not provided the windows for the child's benefit, but for the purpose of allowing adults to see into the carriage. None of these inventions have put windows in the body portion of the vehicle, but only in the hood area.

It is a primary object of this invention to provide a stimulating environment within a baby carriage by giving the infant the opportunity of using its visual powers by making available more for the infant to see.

It is a further object of this invention to provide transparent materials in strategic parts of the carriage to allow the infant to look through.

The foregoing and other objects of this invention will appear from the detailed description below, taken in conjunction with the attached drawings in which.

Figure 1:
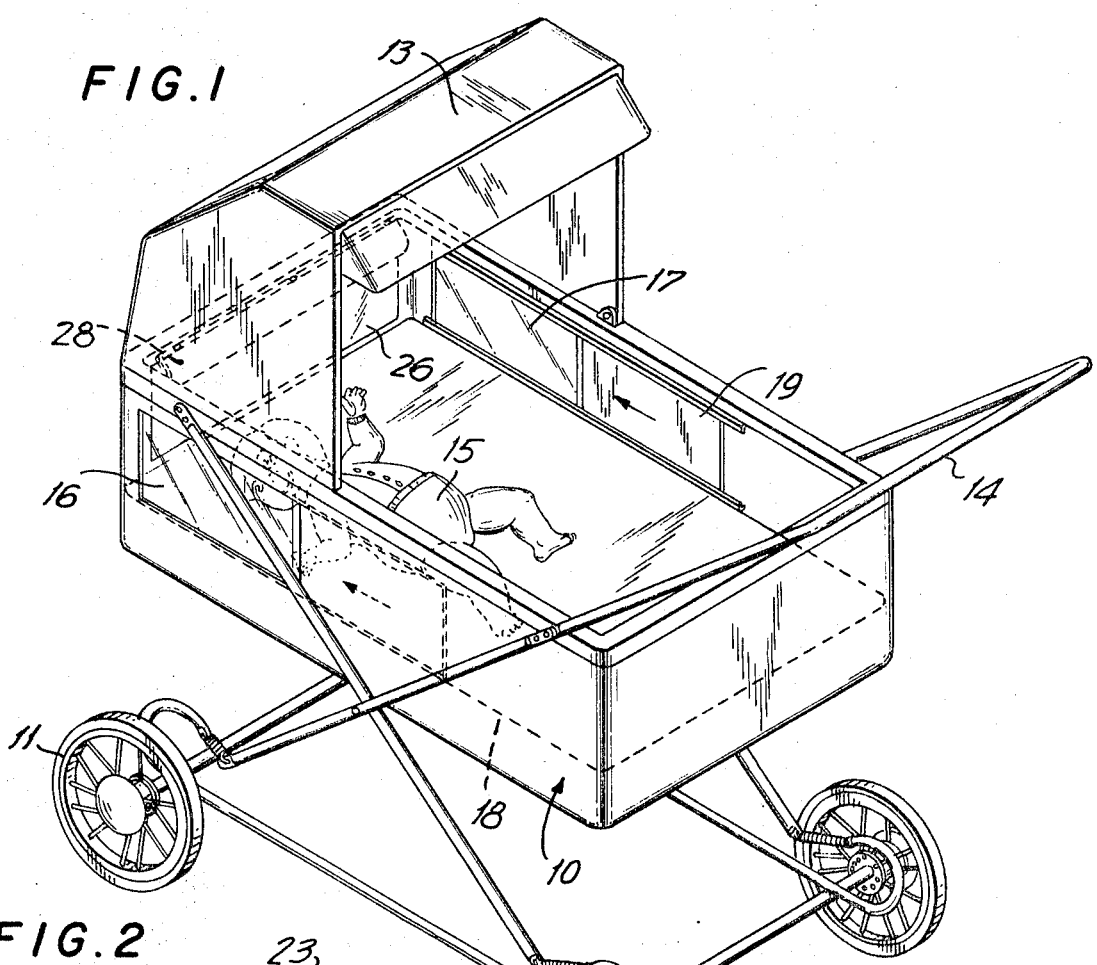
FIG. 1 is a side view of a baby carriage embodying features of the present invention.

Referring to FIG. 1, the body portion of a baby carriage 10, wheels 11 and 12, hood 13, handlebar 14, child lying on back facing side 15, transparent material inserts 16 and 17 on alternate sides of the carriage, top of carriage mattress 18, and sliding panels 19 are shown.

As can be seen from FIG. 1, the child lies on the mattress which is approximately level with the bottom of the transparent insert. The child is shown lying on his back facing sideways. Either side the child faces he is able to see out one of the transparent inserts. The child can also lay on his stomach and have his head turned either way and still have the benefits of the visual stimulation via the transparent inserts.

Figure 2:
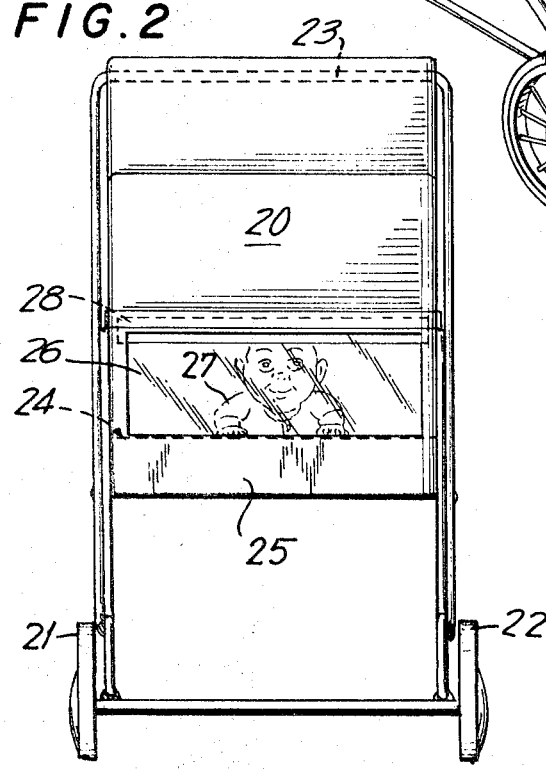
FIG. 2 is a front view of a baby carriage embodying additional features of the present invention.

Referring to FIG. 2, the body portion of a baby carriage 25; hood 20, with wheels 21 and 22, handle 23, top of carriage mattress 24, transparent insert 26, child lying on his stomach supporting himself on his hands facing front (looking through transparent insert) 27, and flap 28 are shown.

As can be seen from FIG. 2, the child lies on the mattress which is approximately level with the bottom of the transparent insert. The child is shown lying on his stomach supporting himself on his hands facing front (looking through the transparent insert).

Figure 3:
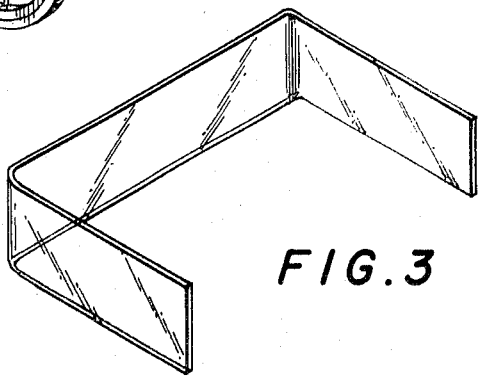
FIG. 3 is one-piece molded transparent unit.

It is also possible to make the inserts in the form of a single molded transparent piece that extends from the sides adjacent to where the head of the baby is around to the front end of the body portion of the carriage (FIG. 3).

Sliding panels or flaps that roll up like window shades or that can be snapped over the transparent material would be necessary to terminate the child's vision and interest when it is time for him to rest (sleep).

Of course care must be taken when selecting the transparent material. It obviously cannot be of the type that shatters. Some of the plastics sweat, while others tend to absorb heat. The material cannot be of a translucent type since this will tend to blur images seen through it. The material must be stiff enough so that the child cannot bend it readily and possible suffocate himself.

Having carefully described that which we deem to be our invention, we wish it to be known that various modifications of the foregoing disclosure will naturally present themselves, but that we consider that all such modifications as may be suggested or taught herein, are part of the full scope of our invention.

We claim:

1. In a baby carriage having a body supported on wheels, said body including substantially vertical front, rear and side walls to define a cradle, and a mattress disposed within said cradle to accommodate a prone baby whose head is normally adjacent said front wall, the improvement comprising transparent windows inserted in said front and side walls to enable the baby to look therethrough, the lower edge of the windows being substantially level with the upper surface of said mattress whereby the baby is able to look through said windows in the prone position to see external objects at his own level without having to raise his head above said walls, said windows being constituted by a single transparent piece having a U-formation to define front and side openings affording the baby in said carriage a panoramic view.

2. A carriage as set forth in claim 1, further including an opaque hood attached to the front and side walls of said carriage to protect the head of the baby in said carriage from the rays of the sun.